Nov. 12, 1963  K. W. ABENDROTH ETAL  3,110,462
CONTROL SYSTEM FOR ELECTRIC MOTORS
Original Filed May 9, 1958
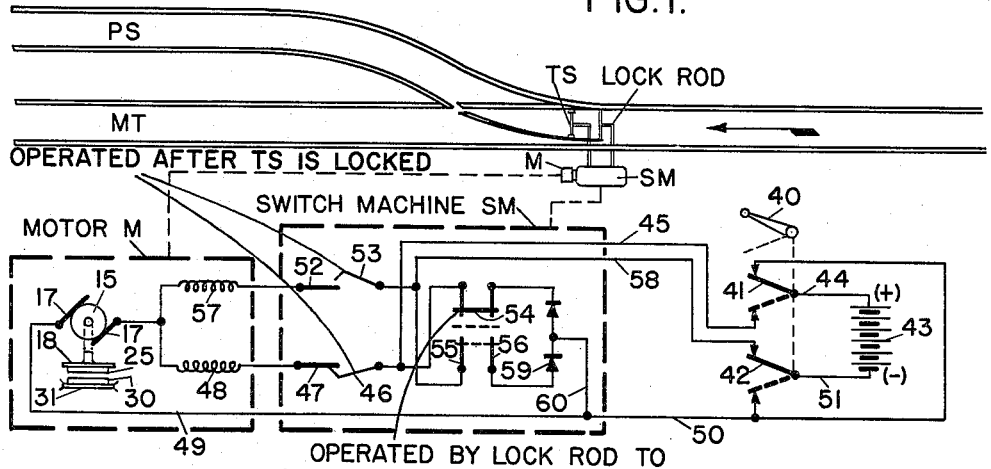
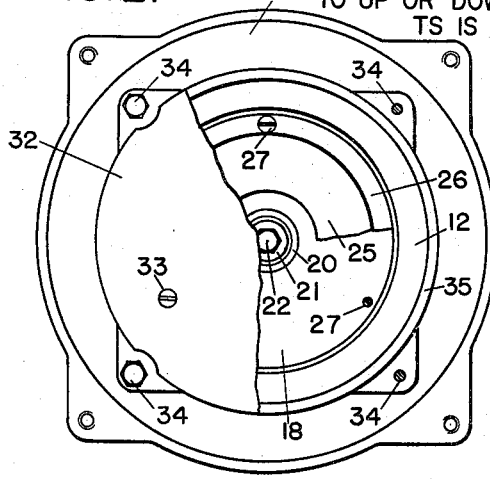
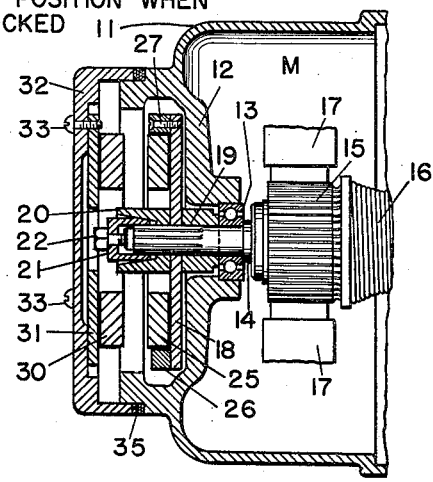
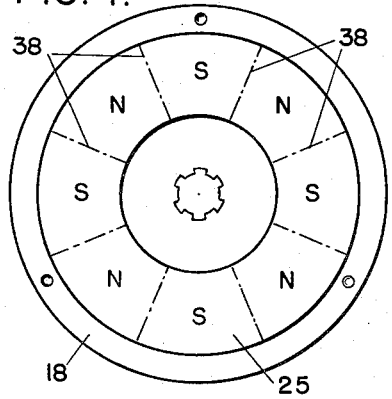
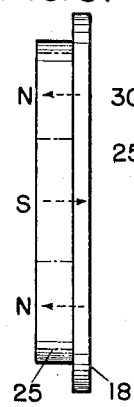
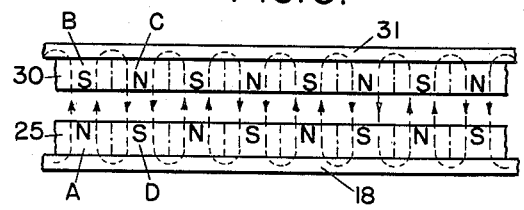
INVENTORS
K.W. ABENDROTH AND
C.L. SWANTON
BY
*Forest B. Hitchcock*
THEIR ATTORNEY

United States Patent Office 3,110,462
Patented Nov. 12, 1963

3,110,462
CONTROL SYSTEM FOR ELECTRIC MOTORS
Karl W. Abendroth, Rochester, and Charles L. Swanton, North Chili, N.Y., assignors to General Signal Corporation, a corporation of New York
Continuation of abandoned application Ser. No. 734,334, May 9, 1958. This application Oct. 2, 1961, Ser. No. 147,699
7 Claims. (Cl. 246—240)

This invention relates to the control of electric motors, and it more particularly relates to the stopping and holding when inactive of railway switch machine motors.

This application is a continuation of the Abendroth et al. application No. 734,334, filed May 9, 1958, which is now abandoned.

In general practice, railway switch machines are motor operated to either of two extreme positions through a cycle of operation which first unlocks the switch, then moves the switch points, and then again locks the switch, so that the switch points are normally locked when in a full normal or reverse position. Although the motor is usually connected to the switch machine mechanism through a conventional plate-type clutch to provide slippage when necessary, the drive can be considered as practically a direct drive under normal operation conditions. In other words, once the switch points are operated to a normal or reverse position and locked, they will remain in that position until moved by rotation of the motor armature, or by special hand cranking if such a means is provided.

It has been found, however, that certain vibrations set up by passing trains can actually cause a so-called drifting movement of the motor armature. This movement, if continued for a sufficiently long time, could produce enough revolutions of the motor armature to actually operate the switch machine mechanism to a position wherein the switch is actually unlocked. Such a condition is very dangerous as the switch points would be unlocked and free to move during the passage of a train which might possibly cause its derailment.

Such possibilities being recognized, the common practice is to equip the switch machine motor with an electromagnetic brake. Such an electro-magnetic brake holds the motor armature in its last operated position until the motor is again energized, whereupon the brake is released. Such electro-magnetic brake also performs another function in that it is used to dissipate the kinetic energy of the motor after it has operated the switch machine mechanism to a fully operated position. Such a structure is found to be quite expensive because of wear and maintenance and in view of the fact that it requires energy for each operation although its main use is holding the motor armature.

The present invention contemplates the use of a dynamic snubbing circuit means in combination with a permanent magnet holding means. The dynamic snubbing stops the motor after it has completed its operating cycle and then the permanent magnets hold the motor armature in its stopped position. Thus, the switch machine motor can be effectively snubbed and held by a means which is very economical and simple in assembly and manufacture and requires a minimum of operating energy.

Generally speaking, the permanent magnet holding or detent device proposed in the present invention comprises a pair of ring shaped magnetic discs which are suitably mounted within the motor casing, one on the armature shaft and one on the end cap of the motor casing. The two magnetic discs are disposed adjacent each other with a suitable air gap therebetween, one remaining stationary at all times and the other revolving with the motor shaft when it is rotated.

Both magnetic discs are alike and made of a suitable magnetic material. Each magnetic disc simulates a plurality of magnetic segments joined together to form a ring shaped disc. The discs are actually comprised of one piece of magnetic material in which adjoining sections or portions are poled in different directions to simulate segment formations. In the illustrations, a form has been chosen wherein each magnetic disc has been poled to simulate eight segments, each adjoining segment being poled in an opposite direction. In effect, there are eight permanent magnets in one disc directly opposite the eight permanent magnets in the other disc with an air gap between them. When opposite poles in the two discs are lined up, the opposing magnets will attract each other, and when similar poles are lined up, the opposing magnets will repel each other.

During the operation of the switch machine, the motor is energized and is operating under power; but when the switch machine reaches a locked condition, the power circuit is open and a dynamic snubbing circuit is closed. This dynamic snubbing circuit rapidly brings the motor armature and connected gears to a near stop condition. As this slowing down of the motor takes place, the magnetic poles on the two discs continue to alternately attract and repel each other. When the momentum of the armature reaches a value below that which it takes to overcome the tractive pull between the magnets, then the armature is held in that position. The holding force of the magnets is sufficient to prevent the armature from being moved to a new position due to vibration or the like; yet such holding force is not strong enough to prevent the starting torque of the motor from initiating operation of the switch machine.

Even though the holding force of the opposing magnets does offer some opposition to the starting torque of the motor, it does not materially affect the normal operation of the motor once it is initiated into its driving speed of rotation. This is because one member carrying alternate north and south poles is rotated with respect to a similar stationary member also carrying alternate north and south poles. Thru a rotation angle of one pole pitch the relation of the magnets will change from like poles opposite to unlike poles opposite. As the arc distance between like poles is decreasing toward zero the mutual repulsion will cause a torque tending to stop the rotation. As the distance now increases the repulsion causes a torque tending to aid rotation. In a similar manner when unlike poles are approaching each other the attraction causes a torque which tends to aid rotation and when the unlike poles are separating the attraction tends to stop rotation. Thus, the magnetic forces cancel each other, and once the regular operation speed of the motor is attained such holding and driving forces are summated to substantially zero so rapidly that the net effect is substantially zero insofar as the driving torque is concerned. At least the net effect of the magnets on the regular operation of the motor is so small relative to the actual power required that it is not practically observable during test. The holding force may be varied to the value desired by adjusting the air gap between the two magnetic discs.

Other objects, purposes and characteristic features of the present invention will be in part obvious and in part pointed out as the description progresses in detail. Reference will be made to the accompanying drawings in which distinctive reference characters designate the different parts and in which:

FIG. 1 shows a simplified track switch layout to illustrate in a diagrammatic manner the switch machine components with the magnetic holding means of the present invention applied thereto and a typical control circuit therefor;

FIG. 2 is an end view of the switch machine motor with parts broken away to show the permanent magnet holding means of the present invention applied thereto;

FIG. 3 is a side elevation sectional view of one end of the switch machine motor and shows the permanent magnet holding means of the present invention applied thereto;

FIG. 4 is a slightly enlarged plan view of one of the permanent magnet ring discs and shows the ring divided into a plurality of segments by dot and dash lines to illustrate how the ring disc is poled to simulate a plurality of magnets positioned side by side;

FIG. 5 is an end view of the permanent magnet ring disc shown in FIG. 4 to illustrate the direction of poling; and FIG. 6 is a developed view showing the various imaginary magnetic segments laid side by side and attached to their respective soft iron yokes with an air gap therebetween to illustrate the various flux paths created with the attracting poles are lined up opposite to each other.

With reference more particularly to FIGS. 2 and 3, there has been shown one end of a typical switch machine motor M comprising a casing 11 and an end wall 12. A ball bearing 13 is mounted in the end wall 12 and receives one end of the motor shaft 14 which carries the usual commutator 15 and armature 16. Suitable brushes 17 cooperate with the commutator 15.

The shaft 14 protrudes from the bearing 13 and is splined to receive a circular iron plate 18 which is located in a recess in the outside of the end wall 12. The plate 18 is spaced from the end wall by means of a bushing 19 which fits over the shaft 14 and bears against the bearing 13. The plate 18 is held in position on the shaft 14 by another bushing 20 which is forced against the side of the plate 18 by means of a tapered washer 21 and a screw 22 threaded into the end of the shaft 14. Thus, the plate 18 is securely mounted for rotation with the shaft 14.

This circular iron plate 18 serves as a mount for one of the magnetic ring discs 25, which is suitably bonded thereto, and also serves as a yoke to provide a flux path between the various magnetic poles, as will be explained more fully hereinafter. A non-magnetic ring 26, preferably made of aluminum to reduce weight, is also fastened to the plate 18 by means of screws 27. This ring 26 is located around the outside edge of the plate 18 and encircles the magnetic ring disc 25. Due to manufacturing tolerances and assembly purposes, the inside diameter of the ring 26 is made slightly larger than the outside diameter of the magnetic ring disc 25 and the gap therebetween is filled with bonding cement.

This structure permits the magnetic ring disc 25 to be mounted on the plate 18 in a manner whereby perfect balance with respect to the motor shaft 14 is obtained. Also, as the magnetic ring disc 25 is precisely located within the confines of the ring 26 and bonded to both the ring 26 and the plate 18, the assembly provides a solid unit in perfect balance, thus practically eliminating any possibility of disintegration due to centrifugal force when rotated at high speeds.

The other magnetic ring disc 30 is similarly bonded to a circular iron plate 31 which in turn is fastened to the motor casing end caps 32 by means of screws 33. The end cap 32 is then secured to the motor casing 11 by means of screws 34 (see FIG. 2). This mounting positions the magnetic ring disc 30 directly adjacent the magnetic ring disc 25, with an air gap therebetween. This air gap may be varied by either adding more or taking away suitable shims 35 which are located between the contacting surfaces of the end cap 32 and the motor casing 11.

It can now be seen and understood that there has been provided a motor structure with two magnetic ring discs 25 and 30 mounted therein in a manner whereby the disc 25 rotates with the motor shaft 14 and the disc 30 remains stationary at all times.

These magnetic discs 25 and 30 may be formed of any suitable magnetic material adapted for use in connection with permanent magnets, so long as such material is of the type to require high coercive forces to reduce the residual magnetism to zero, since such material should have high retentivity. One material found suitable for these discs is known as "Indox" No. 5 manufactured by the Indiana Steel Products Company, Valparaiso, Indiana, U.S.A. As one example of dimensional characteristics, it has been found that discs of 9/16 inch thick and of outside diameter of 5 inches are practical for use in one commercial type of switch machine.

In this type of permanent magnet construction, as shown for example in FIGS. 4 and 5, the ring disc 25 of suitable magnetic material is bonded to a soft iron ring disc plate 18 which serves both as a mount and a flux path yoke. The ring disc 25 is then divided into magnetized segments as illustrated by the dot and dash lines 38. Eight such segments are shown in this particular case, but any suitable number could be used. The complete unit is magnetically poled in a manner that each adjoining segment has a flux path poled in a direction opposite to the other, thus presenting the equivalent of a series of adjoining magnets having alternate north and south poles on a common facing surface.

The above mentioned bonding between the permanent magnet disc 25 and the plate 18 (also disc 30 and plate 31) is accomplished by using a suitable bonding or cement material which makes a very tight bond when subjected to pressure and heat. This bonding affects the magnetic path but very little because the disc 25 and the plate 18 come so close together and are separated by one a tissue-thick amount of bonding material. In this connection, it should be understood that other forms of attaching these parts can be employed such as riveting or the like.

When two such magnetic units are disposed adjacent each other with an air gap therebetween as illustrated in the developed view of FIG. 6, it is obvious that, when a north pole of one magnetic segment is positioned opposite a south pole of another magnetic segment, there is a magnetic attraction between them. As there are eight such magnetic segments in each magnetic unit, there is the effect of eight magnets in one unit attracting the eight magnets in the other unit. The magnetic flux paths would exist between the two units as illustrated by the dotted lines in FIG. 6. For example, flux from the north pole N of segment A passes across the air gap to the south pole S of segment B, through the iron plate or yoke 31 to the segment C, from the north pole N of the segment C across the air gap to the south pole S of the segment D, and through the iron plate or yoke 18 back to the segment A. In brief, the magnetic flux from the north pole of one segment passes to the south pole of the opposite segment and such flux divides in its yoke plate to return through the adjacent segments and the yoke plate of said one segment. When the two discs 25 and 30 are in this position, the attractive pull between them is at a maximum.

When the discs 25 and 30 are so located as to be displaced one segment to the right or left from that position shown in FIG. 6, then the north poles N of one disc are opposite the north poles N of the other disc. This produces opposing fluxes; and when the discs are in these relative positions the opposition forces are at a maximum.

It can thus be seen that as the disc 25 is rotated past the disc 30, the forces between them alternately repel and attract and vary between the two maximums, which in effect produces a force varying in a sine wave manner. For this reason, the forces cancel each other when the disc 25 is rotating at speed and the only losses involved are those of hysteresis and eddy current losses which for practical purposes are insignificant in the parts of the sizes here involved.

Referring now particularly to FIG. 1, there has been shown in a diagrammatic manner a typical switch machine motor operating circuit which incorporates dynamic snubbing to brake the motor after it has completed its operating cycle, and which motor incorporates the permanent magnet holding means proposed in the present invention. A main railroad track MT is shown as having a passing siding turnout PS controlled by a track switch TS operated by the usual switch machine SM, with the track switch TS positioned to the right for main line traffic in the direction of the arrow.

Let us assume that it is desired to operate the track switch TS from its normal right-hand position as shown to a reverse left-hand position to divert traffic to the passing siding PS. Upon operation of the control lever 40 to its dotted line position, the control contacts 41 and 42 would shift to their dotted line positions to close an energizing circuit for the motor M which may be traced from the positive (+) side of the battery 43, wire 44, control contact 41, wire 45, switch machine contacts 46 and 47, winding 48 of the motor M, brushes 17 and the motor armature commutator 15, wires 49 and 50, control contact 42 and wire 51 back to the negative (−) side of the battery 43. With the motor M energized, the switch machine SM will operate the track switch TS to a reverse locked position, whereupon the contacts 46 and 47 will open to break the motor circuit.

It should be understood that during operation of the switch machine SM from either position to its opposite position both sets of contacts 52—53 and 46—47 are closed. This is so that the switch machine SM may be reversed in mid-stroke if necessary. In addition, the movable contact 54 assumes a central position during operation of the switch machine, and is moved to one or the other extreme position when the switch machine assumes a corresponding normal or reverse operated position and is locked up. This occurs simultaneously with the opening of the appropriate contacts 46—47 or 52—53 for the corresponding position. Detail structure for operating the contacts in the manner which has been described, can be provided, for example, as is disclosed in FIG. 1 of the Howe Patent No. 1,605,546. Thus, the operating circuit for the motor is opened just slightly before the snubbing circuit for that position is closed.

Under the operation being assumed, the contacts 46—47 are opened as soon as the switch machine reaches its reverse locked position; and at the same time the movable contact 54 bridges the fixed contacts 55 and 56 to complete a dynamic snubbing circuit. This snubbing circuit derives energy from the rotation of the armature and may be traced from the brush 17, winding 57, contacts 52 and 53, wire 58, switch machine contacts 55, 54 and 56, rectifier 59, wires 60 and 49, brush 17 and back to the armature commutator 15.

Thus, once the motor M completes its operating cycle, it is effectively snubbed dynamatically so that it is quickly braked to a near-stop condition, whereupon the permanent magnet holding means including the yoke plate 18 with its associated magnetic ring disc 25 and the yoke plate 31 with its associated magnetic ring disc 30 will effectively bring it to a stop position where it is held against creeping.

It should be obvious from the circuit arrangement shown that a similar cycle of switch machine operation will be completed when the control lever 40 is returned to the position shown to return the track switch to its normal main line position.

When the switch machine is operated to a full normal or a full reverse position, the throw bar which extends to the switch machine from the switch points, may have considerable pressures opposing its position; but these forces are exerted against the locking dogs which have been moved into position in the switch machine so that there is little if any residual forces exerted on the motor. It is for this reason that a relative small holding force, as produced by the permanent magnet holding means here described, can hold the motor from any creeping or slight movements due to vibrations or the like. In other words, the holding forces required are relatively small compared to the operational forces required.

Having shown and described one form which the present invention can assume and the manner in which it performs, it should be understood that various adaptations and deviations in the structure could be made without departing from the spirit of the invention within the scope of the appended claims.

What we claim is:

1. An electric motor comprising, a motor housing, a rotor on a rotor shaft within said housing, two similar discs oppositely disposed along the axis of the rotor shaft, each of the discs comprising a plurality of radially disposed permanent magnets secured to a plate of magnetic material, one of the discs being secured on said rotor shaft, and one of the discs being secured to said motor housing, whereby said permanent magnets offer little resistance to operation of the motor when the motor shaft is in rotation but are effective to resist rotation when said motor is not being operated.

2. An electric motor according to claim 1 wherein said magnets on said rotor shaft are secured to said disc by a retaining ring.

3. An electric motor control system comprising, a motor housing containing at least one stator winding, a rotor on a rotor shaft within said housing, two similar discs oppositely disposed along the axis of the rotor shaft, each of the discs comprising a plurality of radially disposed permanent magnets, one of said discs being secured on said rotor shaft, and one of said discs being secured on said motor housing, and circuit means including said stator winding and said rotor for selectively operating said rotor shaft, said circuit means being effective to apply a shunt to the rotor when the operation of the rotor is to be terminated, whereby said shunt reduces the speed of the rotor and said permanent magnets are effective to resist rotation of the rotor when said motor is not being operated.

4. An electric motor control system comprising, a motor housing containing at least one stator winding, a rotor within the housing on a rotor shaft, two similar discs oppositely disposed along the axis of the rotor shaft, each of the discs comprising a plurality of radially disposed permanent magnets secured to a plate of magnetic material, one of said discs being secured on said rotor shaft, and one of said discs being secured to said motor housing, a retaining ring securing said permanent magnets to said disc on said rotor shaft, and circuit means including said stator winding and said rotor for operating said rotor shaft when energized, whereby said permanent magnets offer little resistance to operation of the motor by said circuit means but are effective to resist rotation of the rotor when said motor is not being operated.

5. A switch control system comprising a railway track switch having normal and reverse locked positions, a switch operating mechanism including an electric motor having a housing and a motor shaft for selectively operating said track switch to designated normal and reverse locked positions, two similar discs oppositely disposed along the axis of the rotor shaft, each of the discs comprising a plurality of radially disposed permanent magnets magnetically poled alternately in opposite directions, one of said discs being secured on said motor shaft, and one of said discs being secured on said motor housing, a circuit controller connected to the track switch having contacts actuated to an open position when said track switch is unlocked and actuated to a closed position when said track switch is in its normal or reverse locked position, and circuit means for energizing said motor to selectively operate the track switch to its normal and reverse locked position respectively, said circuit means being effective to apply dynamic braking to said motor through said contacts and through an operating winding of the motor only when the track switch is locked, whereby the dynamic braking slows the rotation of the motor shaft after deenergization of the motor and the magnetic discs hold the motor shaft to prevent rotation when the switch machine is not in operation.

6. A switch control system according to claim 5 wherein the permanent magnets secured to said disc on said motor shaft are within a retaining ring.

7. A switch control system according to claim 5 wherein said disc secured on said motor housing is adjustable relative to the disc secured to the motor shaft for adjusting the relative torque that can be developed by the permanent magnets jointly to resist rotation of said motor shaft.

References Cited in the file of this patent

UNITED STATES PATENTS

| | | |
|---|---|---|
| 1,170,360 | Taylor | Feb. 1, 1916 |
| 2,248,673 | Howe | July 8, 1941 |